United States Patent [19]

Hilton

[11] 4,126,706

[45] Nov. 21, 1978

[54] PROCESS FOR FORMING DOUGH RIBBON

[75] Inventor: Barney W. Hilton, Dallas, Tex.

[73] Assignee: Frito-Lay, Inc., Dallas, Tex.

[21] Appl. No.: 718,915

[22] Filed: Aug. 30, 1976

[51] Int. Cl.² ............................................. A23L 1/01
[52] U.S. Cl. .................... 426/438; 426/439; 426/456; 426/458; 426/496; 426/516; 426/518; 426/808
[58] Field of Search ............... 426/438, 439, 456, 458, 426/509, 516, 517, 523, 808, 518, 496; 264/176 R; 425/192 R, 376 A; 366/77, 79, 89, 190

[56] References Cited

U.S. PATENT DOCUMENTS

| | | | |
|---|---|---|---|
| 3,457,880 | 7/1969 | Eppenberger | 425/192 R |
| 3,835,222 | 9/1974 | Wisdom et al. | 426/808 |
| 3,937,848 | 2/1976 | Campbell et al. | 426/808 |

Primary Examiner—S. Leon Bashore
Assistant Examiner—Peter Chin

Attorney, Agent, or Firm—Bernard & Brown

[57] ABSTRACT

There is disclosed a process for forming farinaceous dough ribbon of good quality and at a substantially constant rate. The ribbon is especially employed in processes involving further handling or treating of the dough as a ribbon of substantial length. Compositions comprising farinaceous solids and water are worked to the desired dough consistency in the barrel of an extruder. A positive displacement device is located between the barrel of the extruder and a die to discharge the dough ribbon from the die at a substantially constant rate. The production of ribbon of acceptable quality can be readily maintained. When an undesirable variation in ribbon quality appears, it can be counteracted by controlling only one process variable in the extruder barrel. The dough ribbons are particularly useful in the preparation of cooked snack food products, e.g., fried corn chips.

31 Claims, 3 Drawing Figures

PROCESS FOR FORMING DOUGH RIBBON

The present invention relates to a process for forming farinaceous dough ribbons of good quality and at a substantially constant rate, and the ribbons are especially useful in further handling and treating operations in which the ribbon is maintained continuous over a considerable length. In the process of the invention solid, particulate, dough-forming compositions comprising farinaceous solids and water, are worked to the desired dough consistency in the barrel of an extruder. A positive displacement device is incorporated in the operation between the barrel of the extruder and a die of restricted cross-sectional area to discharge the dough ribbon from the die at a substantially constant rate, and enable the production of ribbon of good quality to be readily maintained. When an undesirable variation in ribbon quality appears, it can be counteracted and eliminated by controlling only one process variable. The dough ribbons are particularly useful in the preparation of cooked snack food products, e.g., fried chips, of desirable texture, color and extent of expansion.

There are a variety of processes in which it is desired to form a continuous farinaceous dough ribbon having uniform characteristics in order to facilitate handling and processing of the dough into edible food products. In these operations the formed dough can be subjected to, for instance, one or more subsequent operations, such as conditioning, cutting, drying or cooking, to provide intermediate or final products suitable for eating. It is economical when the processing is conducted in a more or less continuous manner, and to enhance the operations it is most advantageous that the dough ribbon be formed at a substantially constant speed over an extended period of operation. When the ribbon is formed at constant speed, downstream processing can be more readily controlled to provide products of more or less constant quality.

One process for forming dough ribbons involves passing the dough through a restricted die to form the dough into the appropriate shape. Typically, in such operations work is performed on the material being transported through the barrel of an extruder in order that the dough ribbon has a consistency and other characteristics which are appropriate for whatever further processing it is to undergo. Such operations, however, have a considerable tendency to discharge the ribbon from the die at uneven rates due to pressure surges caused by variations in the operation of the upstream equipment or in the properties of the dough being processed. Thus, the dough is shear sensitive and its consistency varies in response to the amount of work performed on the dough-forming mixture, its temperature during working, and its moisture content. These variables are interrelated and during the continuous formation of the dough, a change in one variable generally necessitates a change in at least one other, if the dough ribbon is to have substantially constant quality and be formed at a more or less constant rate. Moreover, variations in the production speed may cause the ribbon to have nonuniform thickness or cause premature disruption in the continuity of the formed ribbon, and thereby complicate further processing of the dough or the manufacture of uniform products therefrom.

Shear work is performed on the dough-forming composition as it passes through the extruder barrel, and the amount of work is controlled by several factors such as the speed of the auger or screw in the extruder barrel, the temperature of the barrel, and the amounts of water and solids in the composition. In the extruder barrel the working of the composition is accompanied by a substantial amount of backflow which may occur both in the channel of the auger and around its periphery, i.e., through the relatively small space or clearance which exists between the inside wall of the barrel and the outer surface of the auger. Typically, the backflow is sufficient for the transporting efficiency of the extruder to be less than about one-half of the theoretical volume at 100% efficiency, i.e., the amount of material passing from the discharge end of the working or auger zone of the extruder, and thus through the die, is less than about one-half of the volume represented by the volume of the last flight of the auger multiplied by the speed of the auger. This working serves to convert the composition undergoing working to the desired dough consistency as it passes through the extruder barrel. The desired dough consistency can be generally described as being sufficient to provide a coherent dough ribbon of good quality exiting the die, but yet not so great that the ribbon will not exhibit the desired handling or cooking properties during further processing. Excessive working of the dough is accompanied by an undesirable increase in the consistency or body of the ribbon and frequently one or both of an increase in the translucency of the ribbon and the light reflective properties of its surface. Ribbon of highest quality has a dull surface and may be opaque or nearly so. Also, excessive working of the dough may cause it to form ribbon which is undesirably sticky.

In the dough ribbon-forming operation there are considerable problems in quality control and in providing a ribbon of satisfactory consistency at a relatively constant rate and shape from the die. Thus, if the consistency of the ribbon becomes too great, the amount of work performed on the dough can be decreased by lowering the speed of the extrusion auger, but this reduces the forming rate of the ribbon. To avoid the latter, the temperature of the barrel of the extruder may be decreased to increase the efficiency of the auger. Instead, a similar result could be obtained by reducing the water content of the mixture being worked or two or more of these variables may be changed in the appropriate manner. If the character of the ribbon indicates that the working of the composition is insufficient to form a continuous, coherent ribbon of appropriate characteristics, the foregoing variables can be adjusted in the opposite directions to correct the operation and provide a dough ribbon of satisfactory quality at relatively constant speed. Thus, the auger speed, the temperature of the extruder barrel, or the water content of the mixture being worked could be increased. It is, therefore, seen that acceptable operation of the process is accompanied by considerable control necessities, and simpler and more dependable operations are much desired.

The present invention is directed to a method of forming farinaceous dough ribbons involving the general working-type of extrusion operation described above. One purpose of the process is to obtain dough ribbons that are sufficiently coherent that they remain intact over the desired length to facilitate further handling or treating operations. In the operation the rate of ribbon formation is maintained substantially constant by the use of a positive displacement device between the discharge end of the extruder working zone and a die having a passage of restricted crosssectional area through which the dough ribbon is discharged. By operating the positive displacement device at substantially constant speed, the production of ribbon of good quality can be readily maintained, and most desirably the quality can be kept substantially constant. Moreover, when an undesirable variation in ribbon quality appears, it can be counteracted and eliminated by appropriately adjusting or controlling only one of the process parameters in the extruder barrel such as auger speed, temperature of the extruder barrel, or the water content of the mixture undergoing working, and no adjustment need be made to control the rate of ribbon formation because this is maintained substantially constant by using the corresponding speed of the positive displacement device. Preferably, the good quality of the ribbon is maintained by control of the extruder auger speed in response to any undesirable variation in the characteristics of the ribbon. Quality can be maintained by control or adjustment of more than one of the extruder parameters such as auger speed, or the extruder barrel temperature, or water content of the composition undergoing working in the extruder, but such operations are not preferred.

The consistency of the dough ribbon is a principal quality consideration in conducting the process of the present invention. When the consistency is too great or too low one, or more, of the previously mentioned parameters in the extruder barrel, preferably only one, can be appropriately adjusted as stated above to counteract the difficulty. Control of the process by adjustment of only the speed of the auger is the most preferred manner of alleviating any dough quality problem. As noted above dough ribbons of acceptable quality are often opaque or substantially so and may have a relatively smooth, uniform, coherent texture. The condition causing the production of dough ribbon having a consistency other than desired may not be immediately apparent to the operator, but such difficulty can be corrected by control or adjustment of one or more, preferably only one, of the foregoing described process parameters in the barrel of the extruder, without substantially affecting or altering the speed of the positive displacement pump or the output rate of the ribbon from the die.

The positive displacement pump can be readily controlled and any desired pump speed and ribbon-forming rate can be set by controlling the speed of the pump which in effect is a very broad control feature that is more or less independent of variations occurring in the conditions in the barrel of the extruder. Thus, the pump serves to overcome downstream pressure drops, e.g., that across the die, and its speed can be adjusted to provide the desired ribbon-forming rate. The extruder is, accordingly, isolated from the pressure drop characteristics downstream of the pump which permits close and ready control of the working of the dough without affecting the output rate of the pump and, therefore, the pressure drop across the die. This permits the operation of the extruder to be controlled primarily in response to the quality of the ribbon product, or to the quality of other downstream products such as dried intermediates or the finally cooked material.

The farinaceous dough ribbons made by the process of the present invention are particularly suitable for cooking to an edible form. The manufacture of snack foods, e.g., relatively thin chips, is of particular interest. In these processes the formed dough is cooked, and preferably it is fried in oil as in the case of the deep-fat frying of chips such as potato or corn chips. Generally, the ribbon has a width suitable for forming into a plurality of adjacent, narrower ribbons or strips. The wider ribbon or the narrower strips may be severed, e.g., along imposed, regularly-spaced lines of weakness, into smaller, predetermined size after issuing from the die, and the resulting pieces cooked as such or after undergoing an intermediate, partial drying or other suitable treatment. The severing to form smaller pieces may instead follow any intermediate or final treatment. The imposed lines of weakness may be essentially transverse of and positioned along the length of the dough in a uniform, and preferably equally-spaced, manner. The lines of weakness may, for example, be formed by scoring, perforating or partially cutting the dough across a substantial portion of its width.

A significant purpose of quality control of the ribbon according to the present invention is to insure the maintenance of the ribbon in continuous or integral form over a substantial length of, for instance, at least about 1 foot, preferably at least about 3 feet, to facilitate its use in further handling or treating operations. Thus, the ribbon, with or without intermediate treatment, may be cooked while in a continuous length extending from the die, but one may cook separated bite size pieces or cook longer ribbons sufficient in length to provide a plurality of bite size food pieces, say at least about 5 or 10 or more, from each length by further dividing or severing a given strip of dough at one or more locations along its length. Individual, bite size food pieces are preferably provided by severing the dough after cooking.

The present invention will be described further with reference to the accompanying drawing in which.

Figure 1:
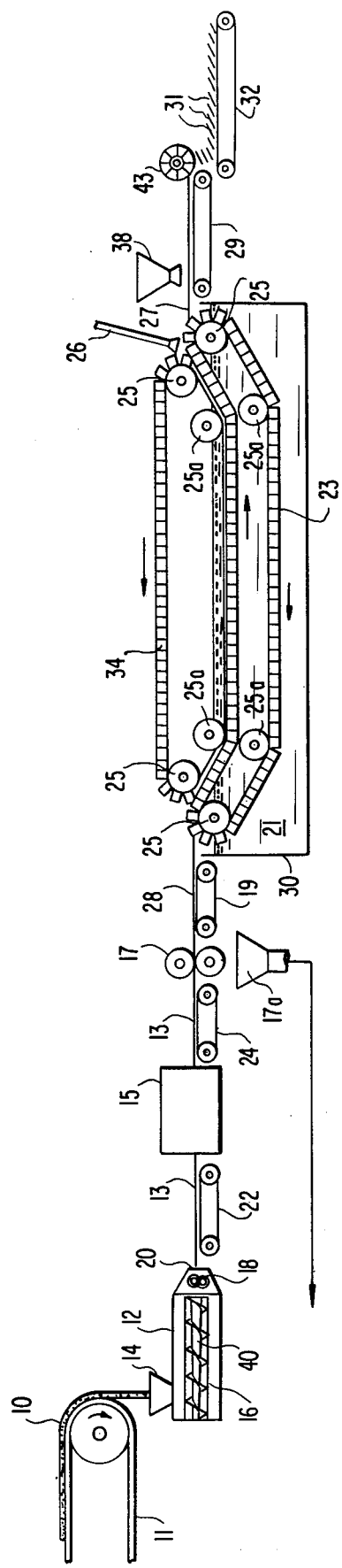
FIG. 1 is a schematic illustration of a dough ribbon-forming process of this invention incorporated in a system for making snack chips.

A system incorporating the dough ribbon-forming process of the present invention is illustrated in FIG. 1. The dough-forming components, including finely-divided farinaceous solids and water, are mixed in suitable mixing equipment, not shown, and the non-coherent mixture 10 is transported by conveyor 11 to hopper 14 of extruder 12. The auger 40 of extruder 12 works the dough-forming components into a dough in the barrel 16 of extruder 12. The dough moves from the discharge end of barrel 16 to positive displacement pump 18. The positive displacement pump 18 is run at a substantially constant speed to supply dough to die 20. The dough is discharged through die 20 in the form of a dough ribbon 13 which is transported by conveyor 22 to dough conditioner 15 wherein the thin ribbon of dough is cured or partially dried to a desired moisture content e.g., in the range of about 10 to 25 weight percent moisture. This conditioning may serve to reduce the moisture content of the dough by at least about 15 weight percent.

Figure 2:
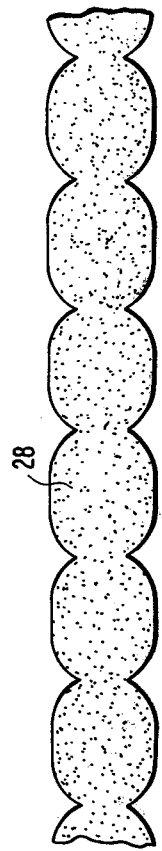
FIG. 2 is a plan view of a ribbon of dough made by the process of this invention and cut in a desired shape.

Following its exit from curing chamber 15, dough ribbon 13 is transported by conveyor 24 to suitable cutting means 17 where the rough ribbon is cut into one or more adjacent, continuous, relatively narrow strips of dough material 28 of predetermined shape, e.g., having alternating wide and narrow portions as shown in FIG. 2 to form imposed lines of weakness across the narrow portions and ultimately to provide individual final chips of predetermined size with converging ends, for instance, round, oval or polygonal having more than four sides. The wide portions of the strips may in width correspond to the same dimension of the chips ultimately produced. The ratio of the width of the wide portion to that of the narrow portion may be, for example, about 1.2:1 to 5:1, preferably at least about 2:1, and the narrow portion may often have a width of about 0.2 to 1 inch. Scraps of dough resulting from cutting can be collected in cutter hopper 17a for recycle to the initial mixing apparatus where the dough-forming components 10 are prepared for ribbon formation.

Following the cutting operation, the individual, side-by-side, strips of dough material 28 are continuously transported by means of conveyor 19 to fryer 30. Fryer 30 is a reservoir which contains frying oil 21 and is heated to the desired cooking temperature by suitable heating means (not shown). Disposed within fryer 30 is a continuous conveyor system made up of a lower, continuous, rotating, conveyor means 23 and an upper, continuous, rotating, means 34 for receiving each strip of dough therebetween. Each upper conveyor means 34 meshes with its respective lower conveyor means 23 to restrain and shape a continuous strip of dough material 28 as it is transported through the reservoir of hot cooking oil 21. The meshed members may be held slightly apart by spacers to provide a space for the dough to expand during frying. The restrained dough may have any desired shape, e.g., it may be flat or concave to simulate an unrestrained, deep-fat fried chip. Thus, to make curved chips, the individual sections of lower conveyor means 23 may be concave and shaped to receive the cooperating convex surface of the individual sections of upper conveyor means 34. It is preferred that the level of hot frying oil 21 be above a substantial portion of the mating surfaces of conveyor means 23 and 34 so that the continuous strips of dough material 28 can be fried as they are submerged and transported through the reservoir of hot cooking oil 21. The cooperating sections of conveyor means 23 and 34 may be perforated to facilitate contact of the dough therebetween with the hot oil. Suitable frying conditions include about 325° to 425° F. and times of about 10 to 40 seconds.

Conveyor means 23 and 34 operably engage sprocket wheels 25. Sprocket wheels 25 can be operably connected to a suitable driving means (not shown) such that they may be rotated at substantially constant speed. Suitable idler wheels 25a may also be utilized to support conveyor means 23 and 34 as they pass through the reservoir of hot frying oil 21.

Blower means 26 is disposed at the exit of the endless conveyor system whereby cooked, continuous strips 27 are subjected to a jet of air to blow-off excess frying oil as the cooked strips 27 are removed from the reservoir of hot cooking oil 21. Strips 27 have essentially the same shape as shown for the cut dough strips 28 in FIG. 2, although they may be expanded somewhat during frying, especially in thickness. After the removal of excess frying oil, seasoning materials such as salt, flavorings, and the like can be sprinkled on continuous cooked strips 27 by means of seasoning dispenser 38. As the seasoning material is sprinkled onto the hot surface of cooked strips 27, it adheres to their surfaces to impart the desired seasoning effect.

Following the application of the seasoning material, each continuous strip 27 is transported by means of conveyor system 29 into contact with separating means 43, e.g., a breaker wheel. Conveyor system 29 may be sufficiently long to allow continuous cooked strips 27 to be cooled prior to passing to separating means 43. Positive cooling means, e.g., forced air, may be used. Depending upon the composition of the cooked strips 27, e.g., if they are derived from potatoes, the strips may be somewhat flexible when leaving the frying oil, and cooling may serve to make the strips friable and more readily severed by some types of equipment, e.g., breaker wheel 43.

The purpose of separating means 43 is to sever continuous strips 27 into individual snack chips 31 of predetermined size corresponding in length from one narrow point of width in strip 27 to the next adjacent narrow point, see FIG. 2. The narrow width provides a line of weakness along which the strip preferentially breaks when subjected to a force, e.g., a bending force imparted by contact with a breaker wheel. The strip may be severed by other means such as a cutting knife. The individual chips may be bite size having, for example, a length and width of about 0.5 to 2 or 3 inches. These dimensions may be equal or unequal. The chips generally have a thickness of about 10 to 100 mils. Following their separation from cooked strips 27, individual chips 31 are deposited on conveyor means 32 and transported to storage or to packaging equipment for placement in containers for distribution.

Figure 3:
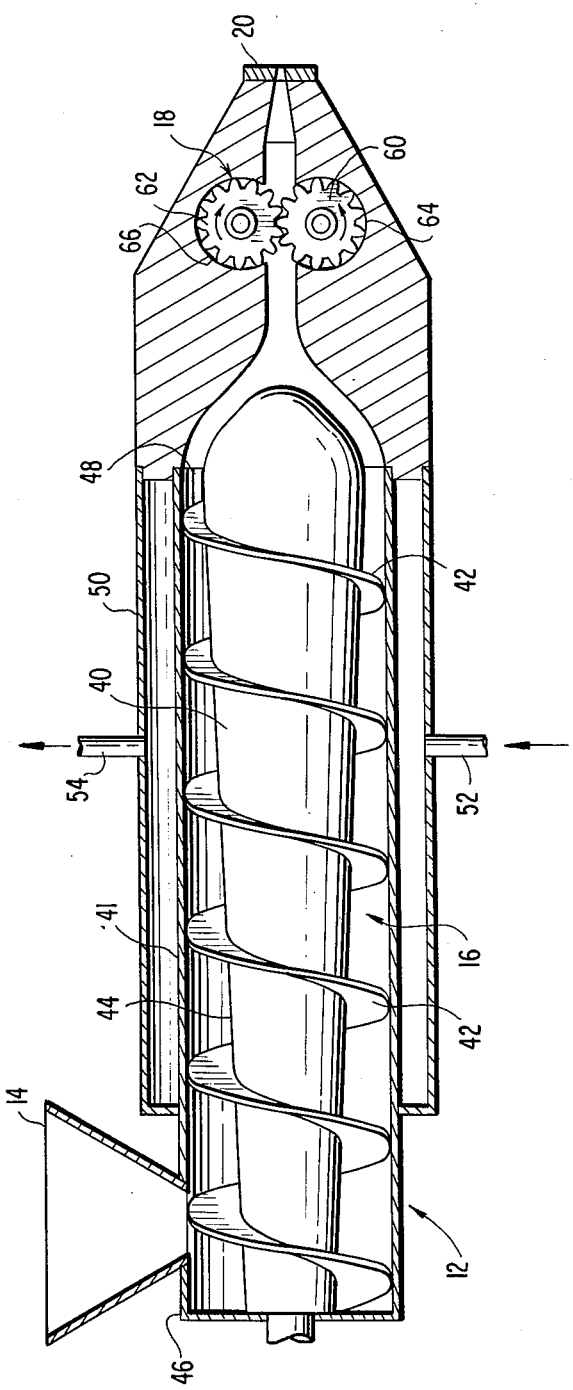
FIG. 3 is a cross-sectional view taken longitudinally along the length of equipment that can be employed in the process of the present invention.

The ribbon-forming operation of the present invention can be considered further with reference to FIG. 3. The extruder has barrel 16 comprised of chamber 41 in which is housed a single auger or screw 40 having a solid, spiral member 42 running along the length of, and formed integrally with, the periphery of shaft 44 of auger 40. Auger 40 is rotated by suitable means, not shown, which can be controlled to provide a desired auger speed. The spiral member 42 of auger 40 moves the dough-forming mixture from the inlet end 46 to the discharge or exit end 48 of the barrel 16.

In the present invention, the extruder is of the compressive type in order that it will work the dough-forming mixture into dough of desired consistency or viscosity. Such extruders are commonly referred to as having a compression ratio about 1, i.e., the volume of the initial flight of the auger is greater than that of the final flight. The compression ratio is the volume of the initial flight of the auger divided by the volume of the final flight. This decrease in volume can be provided, for instance, by one or both of providing an auger with a tapered root diameter as shown in FIG. 3 wherein the shaft 44 becomes larger from the inlet towards the discharge end of barrel 16, or by decreasing the pitch of the member 42, i.e., decreasing the volume of a succeeding flight in the direction of the discharge end of the barrel of the extruder. The extruder will often have a compression ratio of at least about 1.1:1, and this ratio may be up to about 6:1 or more. Preferably, the ratio is about 1.5:1 to 4:1.

In dough-forming operations, the extruder may have a barrel of given size depending on several factors of cost, desired production rate and the like. Typically, the extruder barrel may be at least about 2 inches in internal diameter and may be up to about 10 inches or more in internal diameter, and preferably is about 3 to 6 inches in internal diameter. The auger speed may vary in such operations, and it has been found that rotational speeds of about 50 to 125, preferably about 60 to 100, revolutions per minute, are particularly suitable for use in this invention.

When working the dough in the barrel 16 of extruder 12 in accordance with the present invention, a variable in the process is the temperature of the dough-forming mixture undergoing working. As previously stated, decreases in the temperature of the extruder generally increase the efficiency of the auger and thus decrease the work input to the dough-forming mixture at a given auger speed, and increases in the temperature decrease such efficiency. Suitable temperatures for the extruder barrel in the process of the present invention include about 125° to 180° F., preferably about 150° to 170° F. The elevated temperature of the barrel of the extruder generally serves to partially cook the mixture. With reference to the extruder shown in FIG. 3, a heat exchange jacket 50 is provided around barrel chamber 41 to permit control of the temperature of the barrel while the dough-forming mixture is being worked. A suitable heat exchange medium can be supplied to jacket 50 through inlet pipe 52, and the medium can be discharged from jacket 50 by way of exit line 54. The temperature and amount of heat exchange medium supplied will usually be affected by the amount of heat produced in the barrel of the extruder.

Ribbon-forming operations described above with reference to FIG. 3 have been used to prepare dough ribbons by forcing the mixture discharged from the barrel of the extruder directly through a die, but variations in the operation of the barrel of the extruder in terms of, for instance, pressure, temperature, or composition of the dough-forming mixture during working cause undesirable variations in the speed and rate of discharge of the dough from the die, as well as, in the properties of the dough. In the present invention, these difficulties are considerably avoided by providing a positive displacement pumping device 18 between the discharge end 48 of the barrel 16 and the die 20, and then operating the pump at a substantially constant speed over a substantial period of time. Such operations control the output rate of ribbon product since the constant speed pump discharges a substantially constant volume of dough ribbon from the die regardless of variations in the upstream pressure of the dough or dough-forming mixture, providing the inlet side of the pump has a sufficient supply of dough to satisfy the pumping rate of the pump at a given speed, i.e., the pump is not starved to any significant extent. Actually, in preferred operations the dough generally exerts an elevated pressure on the inlet side of the pump 18 which may be of the same order as the dough pressure at the discharge end 48 of the barrel 16 of the extruder. Suitable pump inlet side pressures are often about 1500 to 2500, preferably about 2000 to 2300, psig.

The positive displacement pump 18 is illustrated in FIG. 3 as being of the gear variety which is the type preferred. The pump has intermeshing gears 60 and 62 rotating in opposite directions as shown by the arrows thereon. The means for rotating gears 60 and 62 may be conventional and is not shown. As the gears rotate into the dough feed, a constant quantity of dough fills the space between the exposed or free gear teeth and is held therein by the adjacent gear housings 64 and 66 until the teeth open into the space forming the inlet or feed side of die 20. The gears 60 and 62 then mesh to force the dough from between the teeth, and at any given speed the pump positively delivers a given volume of dough to and, therefore, through die 20. Extruders equipped with positive displacement pumps are shown in U.S. Pat. Nos. 3,649,147 and 2,680,880, but these systems are not involved in a dough ribbon-forming process similar to that of the present invention.

When forming dough ribbons according to the present invention the pump speed may be set at a desired rate and is maintained substantially constant over a suitable and extended period of operation. For example, a given operation may continue over a plurality of hours or even days without any substantial change in the speed of pump 18. Generally, constant speed operation of the pump is maintained for at least one hour or at least one eight-hour period in order not to cause undue variation in plant output. More likely, the operation will continue at a substantially constant speed for at least a day and may continue for a week or longer, e.g., over substantially all of the operative period between plant shut-downs for cleaning, maintenance or other reason.

The size and shape of the restricted passage in die 20 serve to control the dimensions of the dough ribbon. The ribbon may vary in thickness, but in the process of the present invention the thickness of the dough ribbon is usually less than about 100 mils, often less than about 50 mils. Suitable dough thicknesses include about 10 to 40 mils, and most preferably are about 15 to 30 mils. The widths of the ribbon may vary according to what is desired, and widths of about 5 to 75 or more inches are often used. An adjustable die 20 may be provided to facilitate the formation of ribbons of different thicknesses or to account for wear of the exit opening in the die. The dough passing through the die 20 experiences a considerable pressure drop, and, pressures on the inlet side of the die opening typically include about 1500 to 2500 psig, preferably about 1600 to 2000 psig. The ribbon may be formed at relatively high speeds of say at least about 25 feet per minute, preferably about 40 to 100 feet per minute.

As previously stated, in the process of the present invention, the dough-forming mixture is worked to dough consistency in the barrel of the extruder. For example, the dough in the barrel of the extruder may have a viscosity in the range of about 0.5 to 4 million centipoise at 115° to 130° F., as calculated by capillary rheometry, preferably about 1 to 3 million centipoise. A suitable method for determining such viscosity is in "Physical Properties of Plant and Animal Materials", Part I, No. 1 by N.N. Mohsenin, Department of Agricultural Engineering, Pennsylvania State University, November, 1966. The working of the dough is accompanied by slippage and backflow of the material in the barrel of the extruder. The speed of the auger is substantially greater than what would be required merely to transport the discharge volume through the barrel if the auger were one hundred percent efficient. The auger speed is often at least about double such rate, and is preferably about 3 to 6 times this rate. Stated in another way, the transporting efficiency through the barrel is substantially less than 100%, often less than about 50%, preferably about 20 to 40%. The extent of working conducted on the dough-forming mixture is sufficient to produce a dough of the desired consistency. Thus, the texture of the dough is affected by the extent of working, as are other characteristics of the dough such as its expansion upon passing through the die, and the color and uniformity of the finally cooked products.

The dough-forming material which is worked to dough-consistency in the barrel of the ribbon-forming operation of this invention, is comprised of mixed farinaceous solids and water. Other solids or liquids may be present in the mixture, and the mixture fed to the extruder may have no measureable viscosity. It is preferred that the mixture prior to undergoing significant working in the barrel of the extruder be in essence in the form of flowable solid particles.

Dough-forming mixtures suitable for use in this invention contain farinaceous or starchy vegetable, or other edible plant solids derived from, for instance, potatoes or grains such as corn, rice, wheat, tapioca, and the like. The mixture may contain combinations of such solids, e.g., corn and potato solids; potato and tapioca solids; corn, potato, or rice solids mixed with soy solids; or various other combinations. Preferably, the solids in the mixture are comprised to a major extent of corn or potato solids. Generally, the solids are in finely-divided form and they may be in partially cooked, e.g., gelatinized, form or partially dehydrated, e.g., such as potato flakes or granules. It is preferred that the solids be in gelatinized form prior to charging to the barrel of the extruder. The amount of water in the mixture is sufficient to form upon working a material of dough consistency and may often be about 25 to 60 weight percent of the mixture, preferably about 30 to 50 weight percent. The mixture may also contain other materials such as binders or flavorings which are generally a minor amount of the mixture.

An operation of the present invention can be illustrated by forming a dough ribbon from a mixture composed of 170 parts by weight of milled, cooked corn (40 weight percent water), 35 parts by weight regrind, 17.2 parts of additional water, and small amounts of sugar, soy protein and farina with small bran. The regrind is ground, recycled, conditioned dough scraps resulting from cutting the ribbon into strips as described herein. The foregoing ingredients are mixed in a blending operation to form a non-coherent, particulate mixture.

The dough-forming mixture is discharged onto conveyor 11 and transferred to dough extruder 12 having a barrel with an internal diameter of 4 inches and an auger with a tapered root diameter. The extruder barrel has a compression ratio of 2:1 and is at a temperature of about 155° F., and the auger speed is 66 revolutions per minute. The efficiency of the extruder is about 30%. The dough discharged from the barrel is fed at about 2200 psig. to the input side of a geartype positive displacement pump 18. The speed of the pump is set at 15 revolutions per minute, and the dough is passed through die 20 having an opening 0.020 inches high and 16 inches wide to form a ribbon at the rate of about 50 linear feet per minute. The resulting smooth, coherent, nearly opaque dough ribbon is passed through conditioner 15 for partial drying. The moisture content of the dough is 18 weight percent when exiting dough conditioner 15. The dough is cut into narrow, side-by-side strips having wide and narrow interconnect portions to define continuous strips having a plurality of longitudinally positioned sections. The sections are ovalshaped and each has a longitudinal dimension of about 2¼ inches. The wide portions of the strips are 2 inches and the narrow portions forming the connections between the delineated sections of the strips are about 0.5 inch in width.

The dough strips are fed to the conveyor system in frying oil reservoir 30. The frying oil 21 is maintained at about 380° to 390° F., and the dough strips are immersed in the frying oil for about 18 seconds as they travel therethrough. The lower conveyor belt 23 and the upper conveyor belt 34 hold the dough strip such that it is latitudinally curved downwardly in its middle portion.

The excess oil is blown from the cooked dough strips as they emerge from the frying oil. The cooked dough strips are salted while they are still hot. The strips are contacted with cooling air and individual chips are broken from the stips at the narrow interconnecting segments.

The foregoing operation continues over a period of several hours without significant change and then due to some undetermined variation, the ribbon becomes quite translucent along its edges and has a shiny surface, indicating that the dough has been over-worked and its quality decreased. In order to bring the operation back to the desired norm, and obtain better quality ribbon, the speed of the auger is reduced in the range of 1 to 3 revolutions per minute. Instead of adjusting the speed of the auger to accomplish this desired control, the temperature of the extruder barrel or the water content of the dough could be decreased. Alternatively, but less advantageously, more than one of these parameters could be adjusted to provide the desired correction of the ribbonforming operation in accordance with this invention.

It is claimed:

1. A method of forming a dough ribbon which comprises passing through a compression auger zone a composition comprising farinaceous solids and water to provide said composition as a dough of desired consistency from said auger zone, passing said dough to a positive displacement pumping zone, pumping said dough from said pumping zone by positive displacement through an opening having a restricted cross-sectional area to form said dough ribbon at a substantially constant rate which is substantially less than the theoretical volume of dough that would be discharged from said auger zone at the speed of said auger at 100% efficiency, and controlling said auger zone to maintain the quality of said dough ribbon.

2. The method of claim 1 in which said composition comprises grain or potato solids and water.

3. The method of claim 2 in which said solids comprise corn solids.

4. A method of forming a dough ribbon which comprises passing through a compression auger zone a composition comprising farinaceous solids and water to form said composition into a dough of desired consistency in said auger zone, passing said dough to a positive displacement pumping zone, pumping said dough from said pumping zone by positive displacement through an opening having a restricted cross-sectional area to form said dough ribbon at a substantially constant rate which is substantially less than the theoretical volume of dough that would be discharged from said auger zone at the speed of said auger at 100% efficiency, and controlling one or more of the parameters of the water content of said composition in said auger zone, the temperature of said auger zone, and the speed of said auger, to maintain the quality of said dough ribbon.

5. The method of claim 4 in which said composition comprises grain or potato solids and water.

6. The method of claim 4 in which the consistency of said dough ribbon is maintained by controlling only one of the parameters of the speed of said auger, the water content of said composition in said auger zone or the temperature of said auger zone.

7. The method of claim 6 in which said controlling is by the speed of said auger.

8. The method of claim 7 in which said composition comprises grain or potato solids and water.

9. A method of forming a dough ribbon which comprises charging to an auger zone a particulate, non-coherent composition comprising finely-divided farinaceous grain or potato solids and water, forming said composition into a dough in said auger zone at a temperature of about 125° to 180° F., said auger zone having a compression ratio of about 1.5:1 to 4:1, passing said dough to a positive displacement pumping zone, pumping said dough from said pumping zone by positive displacement through an opening having a restricted crosssectional area with a dimension of less than about 50 mils to form said dough ribbon at a substantially constant rate of less than about 50% of the theoretrical volume of dough that would be discharged from said auger zone at the speed of said auger at 100% efficiency, and controlling said auger zone to maintain the quality of said dough ribbon.

10. The method of claim 9 in which said composition comprises corn or potato solids and water.

11. The method of claim 10 in which said solids comprise corn solids.

12. A method of forming a dough ribbon which comprises charging to an auger zone a particulate, non-coherent composition comprising finely-divided farinaceous grain or potato solids and water, forming said composition into a dough in said auger zone at a temperature of about 125° to 180° F., said auger zone having a compression ratio of about 1.5:1 to 4:1, passing said dough to a positive displacement pumping zone, pumping said dough from said pumping zone by positive displacement through an opening having a restricted crosssectional area with a dimension of less than about 50 mils to form said dough ribbon at a substantially constant rate of less than about 50% of the theoretical volume of dough that would be discharged from said auger zone at the speed of said auger at 100% efficiency, and controlling one or more of the parameters of the water content of said composition in said auger zone, the temperature of said auger zone, and the speed of said auger to maintain the quality of said dough ribbon.

13. The method of claim 12 in which said composition comprises corn or potato solids and water.

14. The method of claim 12 in which the consistency of said dough ribbon is maintained by controlling only one of the parameters of the speed of said auger, the water content of said composition in said auger zone or the temperature of said auger zone.

15. The method of claim 14 in which said controlling is by the speed of said auger.

16. The method of claim 15 in which said composition comprises water and corn or potato solids.

17. The method of claim 16 in which said solids comprise corn solids.

18. A method of forming cooked dough pieces which comprises passing through a compression auger zone a composition comprising farinaceous solids and water to provide said composition as a dough of desired consistency from said auger zone, passing said dough to a positive displacement pumping zone, pumping said dough from said pumping zone by positive displacement through an opening having a restricted cross-sectional area to form said dough ribbon at a substantially constant rate which is substantially less than the theoretical volume of dough that would be discharged from said auger zone at the speed of said auger at 100% efficiency, controlling said auger zone to maintain the quality of said dough ribbon forming said ribbon into a plurality of narrower, adjacent strips of dough, cooking said strips of dough in integral lengths sufficient to form a plurality of cooked pieces of smaller, predetermined size, and forming the cooked lengths of dough into said pieces.

19. The method of claim 18 in which said lengths are submerged in hot oil while being fried in a restrained configuration.

20. The method of claim 19 in which said lengths have alternating wide and narrow portions thereby providing lines of weakness at said narrow portions.

21. The method of claim 20 in which moisture content of said dough is decreased by at least about 15% after passing from said opening and before being submerged in said oil.

22. The method of claim 21 in which said composition comprises grain or potato solids and water.

23. The method of claim 18 in which the consistency of said dough ribbon is maintained by controlling only one of the parameters of the speed of said auger, the water content of said composition in said auger zone, or the temperature of said auger zone.

24. The method of claim 23 in which said controlling is by the speed of said auger.

25. The method of claim 24 in which said composition comprises grain or potato solids and water.

26. A method of forming a dough ribbon which comprises charging to an auger zone a particulate, non-coherent composition comprising finely-divided farinaceous grain or potato solids and water, forming said composition into a dough in said auger zone at a temperature of about 125° to 180° F., said auger zone having a compression ratio of about 1.5:1 to 4:1, passing said dough to a positive displacement pumping zone, pumping said dough from said pumping zone by positive displacement through an opening having a restricted cross-sectional area with a dimension of less than about 50 mils to form said dough ribbon at a substantially constant rate of less than about 50% of the theoretical volume of dough that would be discharged from said auger zone at the speed of said auger at 100% efficiency, controlling one or more of the parameters of the water content of said composition in said auger zone, the temperature of said auger zone, and the speed of said auger to maintain the quality of said dough ribbon, forming said ribbon into a plurality of narrower, adjacent strips of dough, cooking said strips of dough in integral lengths sufficient to form a plurality of cooked pieces of smaller, predetermined size, and forming the cooked lengths of dough into said pieces.

27. the method of claim 26 in which said lengths are submerged in hot oil while being fried in a restrained configuration.

28. The method of claim 27 in which said lengths have alternating wide and narrow portions thereby providing lines of weakness at said narrow portions.

29. The method of claim 28 in which the consistency of said dough ribbon is maintained by controlling only one of the parameters of the speed of said auger, the water content of said composition in said auger zone or the temperature of said auger zone.

30. The method of claim 29 in which said controlling is by the speed of said auger.

31. The method of claim 30 in which said composition comprises water and corn or potato solids.

* * * * *